DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 452

T905,005

ALUMINUM COATING WITH IMPROVED CORROSION RESISTANCE AND METHOD OF MAKING SAME

Lawrence E. Helwig, Hampton Township, Allegheny County, and Michael V. Murray, Monroeville, Pa., and Leland B. Ticknor, Williamsburg, Va., assignors to United States Steel Corporation

Filed Oct. 18, 1971, Ser. No. 190,162
Int. Cl. B23b *15/18;* C23b *5/52*
U.S. Cl. 29—195
1 Sheet Drawing. 14 Pages Specification

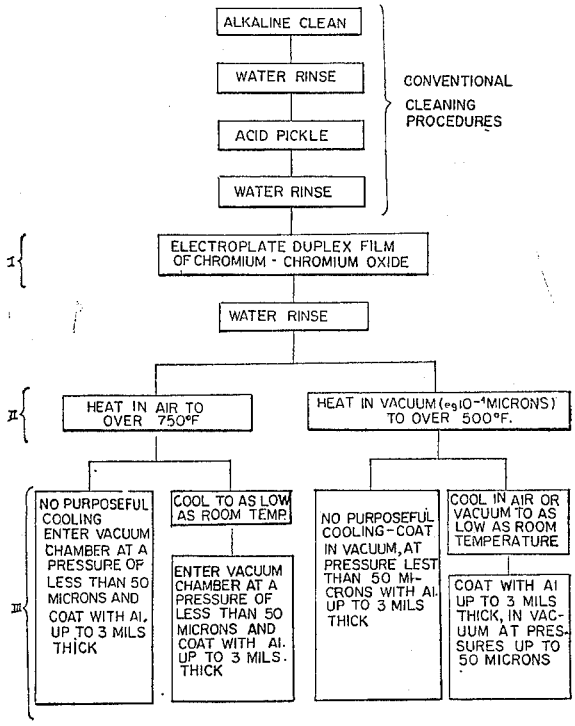

A vacuum deposited aluminum coating with improved adherence and corrosion resistance is achieved by employing the following method. The ferrous substrate is first coated by the electrodeposition of a duplex layer consisting of an underlying layer of chromium metal and an overlying hydrated chromium oxide layer with a thickness of from 0.1 to 1.5 milligrams of chromium per square foot of metal surface. Subsequently the substrate is heated at an elevated temperature for a time sufficient to dehydrate the overlying chromium oxide layer. Thereafter, aluminum is deposited to a thickness of between 0.3 to 3.0 mils in a vacuum chamber maintained at a pressure of less than 50 microns. This method permits the deposition of aluminum over a much wider range of pressures and temperatures than was heretofore possible.

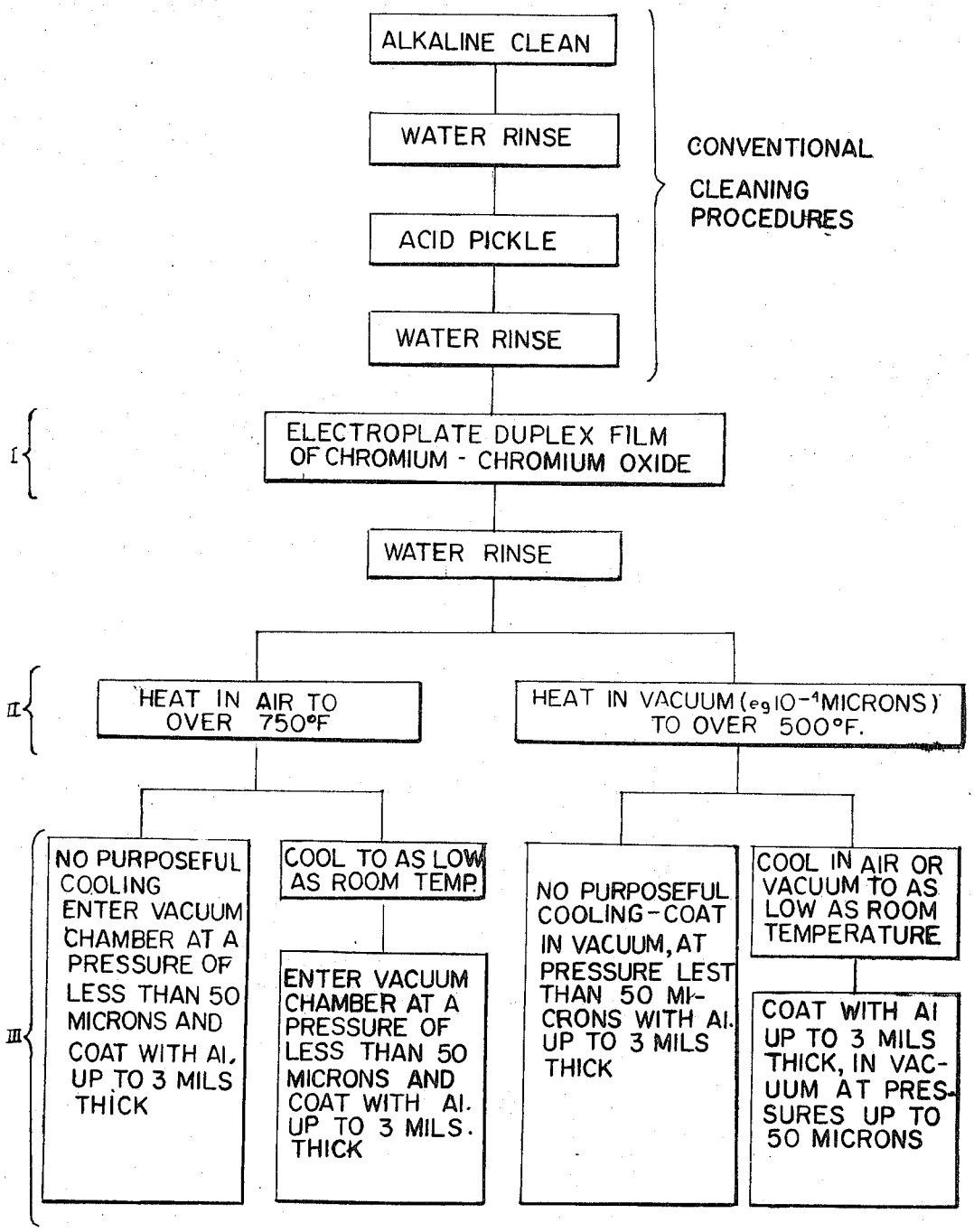

ALUMINUM COATING WITH IMPROVED CORROSION RESISTANCE AND METHOD OF MAKING SAME
Filed Oct. 18, 1971